United States Patent
Davison

(10) Patent No.: US 9,014,944 B2
(45) Date of Patent: Apr. 21, 2015

(54) TURBINE ENGINE SPEED AND VIBRATION SENSING SYSTEM

(75) Inventor: Ronald Stuart Davison, Vista, CA (US)

(73) Assignee: United Technologies Corporation, Hartford, CT (US)

(*) Notice: Subject to any disclaimer, the term of this patent is extended or adjusted under 35 U.S.C. 154(b) by 1460 days.

(21) Appl. No.: 12/487,041

(22) Filed: Jun. 18, 2009
(Under 37 CFR 1.47)

(65) Prior Publication Data
US 2010/0324799 A1  Dec. 23, 2010

(51) Int. Cl.
G06F 19/00 (2011.01)
G06G 7/70 (2006.01)
G01H 1/00 (2006.01)
F02C 9/00 (2006.01)
G01P 3/44 (2006.01)
G01P 21/02 (2006.01)

(52) U.S. Cl.
CPC ...... *G01H 1/006* (2013.01); *F02C 9/00* (2013.01); *G01P 3/44* (2013.01); *G01P 21/02* (2013.01); *F05D 2260/80* (2013.01)

(58) Field of Classification Search
USPC ............. 701/34; 702/116; 73/112.01, 114.25, 73/507, 496
See application file for complete search history.

(56) References Cited

U.S. PATENT DOCUMENTS

| | | | |
|---|---|---|---|
| 4,337,516 A | 6/1982 | Murphy et al. | |
| 4,586,139 A | 4/1986 | Rosenbush et al. | |
| 4,894,613 A | 1/1990 | Tsugawa | |
| 5,130,933 A | 7/1992 | Kitano | |
| 5,303,142 A | 4/1994 | Parsons et al. | |
| 5,747,680 A * | 5/1998 | McArthur | 73/112.01 |
| 5,923,163 A | 7/1999 | Stuible et al. | |
| 5,934,610 A * | 8/1999 | Karolys et al. | 244/53 R |
| 6,347,289 B1 | 2/2002 | VanderLeest | |
| 6,446,018 B1 | 9/2002 | Isermann et al. | |
| 6,502,018 B1 * | 12/2002 | Bessler | 701/31.9 |
| 6,550,018 B1 * | 4/2003 | Abonamah et al. | 714/6.32 |
| 6,804,600 B1 | 10/2004 | Uluyol et al. | |
| 7,110,869 B2 | 9/2006 | Tao et al. | |
| 7,281,522 B1 * | 10/2007 | Sato et al. | 123/492 |
| 7,720,639 B2 * | 5/2010 | Kirchner et al. | 702/183 |
| 2005/0283909 A1 * | 12/2005 | Mylaraswamy et al. | 5/420 |
| 2007/0024147 A1 * | 2/2007 | Hirzel | 310/191 |
| 2008/0161983 A1 * | 7/2008 | Salesse-Lavergne | 701/7 |
| 2011/0173988 A1 * | 7/2011 | Sweet et al. | 60/773 |

* cited by examiner

*Primary Examiner* — Nicholas Kiswanto
(74) *Attorney, Agent, or Firm* — Carlson, Gaskey & Olds, P.C.

(57) ABSTRACT

A turbo machine includes a speed probe that is configured to detect a speed of a rotating feature. Engine controls are used by a processor to control operation of the turbo machine. The processor communicates with the speed sensor and receives the speed signal to produce a command signal. A detection module is arranged in parallel with the processor and communicates with the speed probe to receive the speed signal. The detection module compares the speed signal with data to determine whether the speed signal is reliable. In one example, the detection module bypassed the processor and sends a corrective command directly to an engine control device in response to an unreliable speed signal.

9 Claims, 2 Drawing Sheets

TURBINE ENGINE SPEED AND VIBRATION SENSING SYSTEM

BACKGROUND

This disclosure relates to a turbine engine speed sensing system.

Speed sensing systems are used in a multitude of machines to measure a rotational speed of a component, for example. In aerospace applications, such as auxiliary power units or turbo machines, a speed sensing system is typically used to measure the rotational speed of a turbine and/or compressor.

In one example auxiliary power unit, a speed probe is arranged in proximity to a shaft to sense the rotational speed of the turbine. An analog speed signal from the speed probe is provided to a speed circuit, which converts the analog speed signal to a digital speed signal. The digital speed signal is provided to a microprocessor and/or firmware, which controls operation of the auxiliary power unit based upon the speed signal.

The speed probe output voltage can vary outside of acceptable margins due to a component failure, which can result in the speed circuit producing a digital signal that does not represent an accurate detection of speed. For example, it is possible for an analog output voltage from the speed probe, which provides the speed signal, to become too low, which can result in an over-speed condition.

Complex sensor error detection systems have been developed to identify faulty sensors. For example, a neural network can be used to learn the sensing system norms, which can then be used to determine error and provide compensation for the error. Such systems are very complex and rely upon information from numerous sensors and systems.

What is needed is a speed sensing system that is less susceptible to certain failure modes, but is not unduly complex.

SUMMARY

A turbo machine includes a speed probe that is configured to detect a speed of a rotating feature. Engine controls are used by a processor to control operation of the turbo machine. The processor communicates with the speed sensor and receives the speed signal to produce a command signal. A detection module is arranged in parallel with the processor and communicates with the speed probe to receive the speed signal. The detection module compares the speed signal with data to determine whether the speed signal is reliable. In one example, the detection module bypassed the processor and sends a corrective command directly to an engine control device in response to an unreliable speed signal.

These and other features of the disclosure can be best understood from the following specification and drawings, the following of which is a brief description.

DETAILED DESCRIPTION

Figure 1:
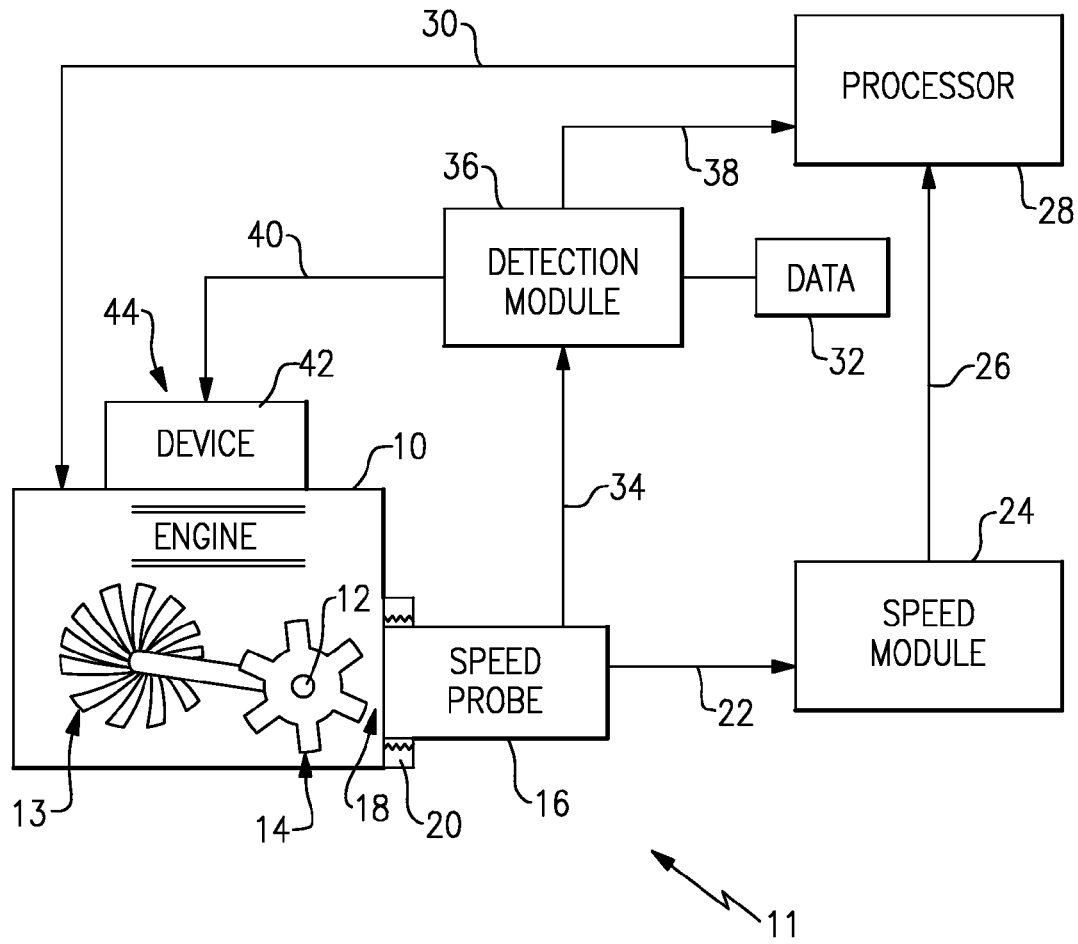
FIG. 1 is highly schematic view of a speed sensing system for a turbo machine.

A turbo machine 10 is schematically illustrated in FIG. 1. The turbo machine 10 includes a shaft 12 supporting a turbine and/or compressor 13. The shaft 12 includes a rotating feature 14, such as a toothed member. A speed sensing system 11 includes speed probe 16 arranged in close proximity to and spaced a desired gap 18 from the rotating feature 14. The speed probe 16 is secured in a desired position relative to the rotating feature 14 by a retaining feature 20, for example. The speed probe 16 may include two speed sensing coil to provide redundant speed signals.

During operation of the turbo machine 10, the speed probe 16 produces a speed signal 22, which is an analog voltage signal, for example, indicative of a rotational speed of the shaft 12. A speed module 24 is in communication with the speed probe 16 and a processor 18. The speed signal 22 is provided to the speed module 24, which may include an analog-to-digital converter, a filter and/or other software, firmware and/or hardware. The speed module 24 transforms the analog speed signal 22 to another speed signal 26 with the same frequency as the speed signal 22, which may be digital. The speed signal 26 is provided to the processor 28, which may include software, firmware and/or hardware. The processor 28 produces a command signal 30 to one or more engine controls 44 associated with the turbo machine 10. The engine controls 44 may also include a device 42. The command signal 30 controls various aspects of the operation of the turbo machine 10 with the engine controls 44.

To provide a redundancy to the speed sensing system 11, a detection module 36 is in communication with the speed probe 16 and the processor 28. The detection module 36 ensures that the speed probe 16 is providing the speed module 24 and, ultimately, the processor 28 a reliable speed signal. The detection module 36 includes data 32 to which the detection module 36 compares a speed signal 34 using a comparator. The data 32 includes voltage limits, in one example. Comparing the speed signal 34, specifically the voltage amplitude (peak-to-peak), to the data 32 determines whether the voltage signal from the speed probe 16 is outside the expected voltage envelope. The speed signals 22 and 34 can be the same signal provided by a simple source or to separately generated signals. In one example, the speed probe 16 produces two signals (22, 34) from one or more speed sensing coils indicative of the rotational speed of the shaft 12 to provide redundant speed sensing.

The detection module 36 can also be used to compare the speed signal 34 to data 32 that includes look-up tables. The look-up tables are indicative of a speed signal representative of "normal" vibrations and operation, for example.

The detection module produces a first detection module signal 38 that is provided to the processor 28. The first detection module 38 indicates to the processor 28 whether the speed signal(s) produced by the speed probe 16 are reliable, which enables the processor 28 to produce warnings or faults and/or take corrective action using the engine controls 44. The detection module 36 also produces a second detection module signal 40 that is provided directly to the device 42, bypassing the processor 28. The second detection module signal 40 enables the processor 28 to be bypassed and provide another level of redundancy. In the example, the second detection module signal 40 commands the device 42 to provide immediate operational control of an aspect of the turbo machine 10.

For example, the speed probe 16 may produce an unreliable speed signal that corresponds to a low voltage, for example. Issues with the rotating feature 14, shaft 12, speed probe 16, coils, electrical connections or component wear may result in speed signal voltages outside the expected voltage envelope. The low voltage may indicate that the speed probe 16 has loosened from the retaining feature, thus increasing the gap 18. Such conditions could result in a potentially harmful over-speed condition of the turbo machine 10, for example. In one example, the device 42 is a fuel control component and the second detection module signal 40 is used to immediately reduce the fuel to the engine through device 42, which may be a shut-off valve, to prevent the over-speed condition.

Figure 2:
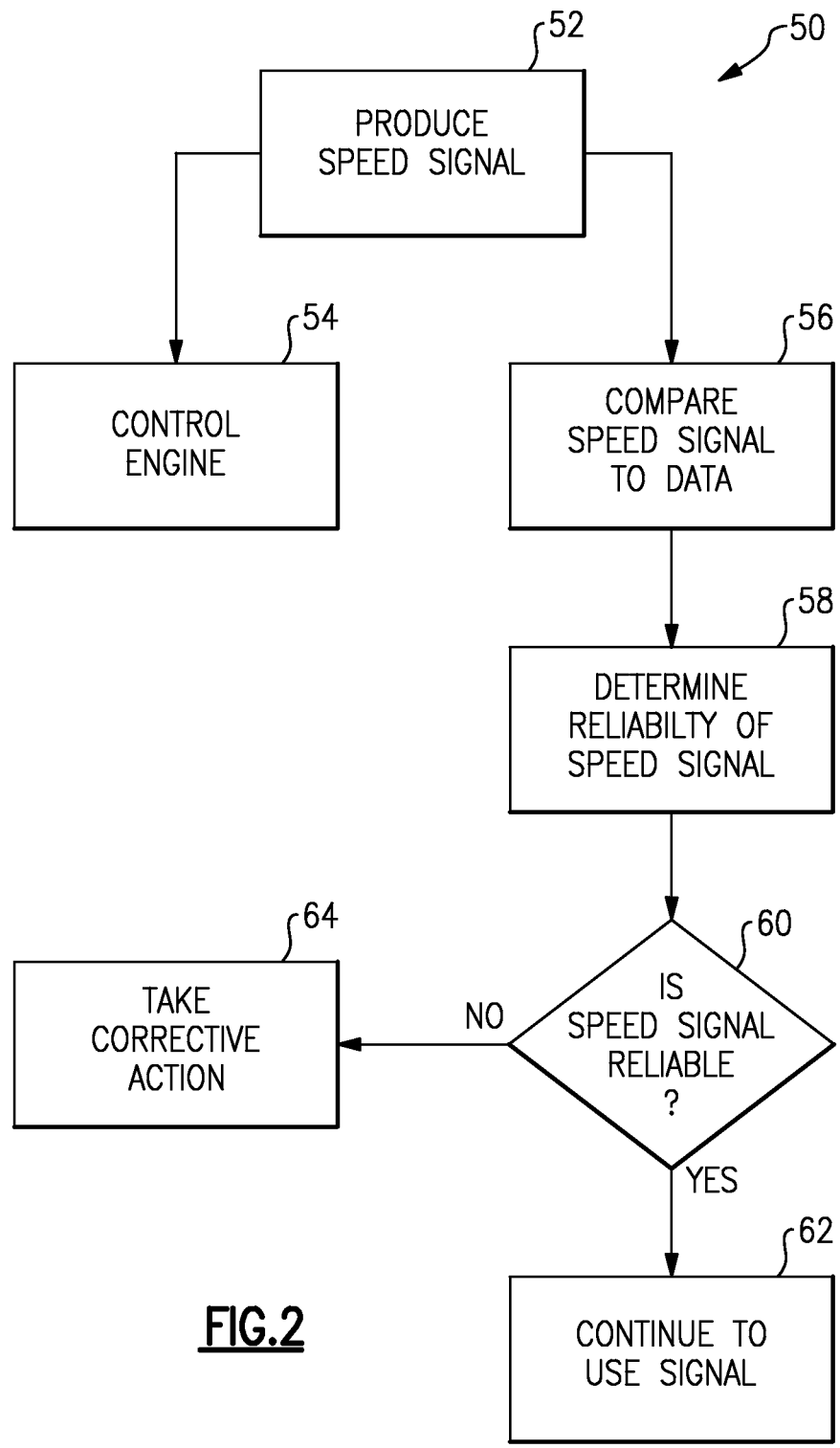
FIG. 2 is a flow chart depicting a method of providing speed sensing redundancy.

Referring to FIG. 2, an example method 50 of providing speed sensing redundancy is illustrated. The speed probe 16 produces one or more signals (22, 34), as indicated in block 52. The speed signal is used to control the engine, as indicated at block 54. Simultaneously, and in a parallel manner, the speed signal is provided to the detection module 36, which compares the speed signal to data 32, as indicated at block 56. The detection module 36 determines the reliability of the speed signal, as indicated at block 58. If the speed signal is reliable (block 60) then the detection module 36 indicates to the processor 28 that the signal can be used, as indicated at block 62. If the signal is not reliable, corrective action (block 64) can be taken by sending a command to the device 42 or signaling the processor 28 to take corrective action to other engine controls 44. For example, corrective action may include shutting down the engine or slowing the rotational speed of the engine. Additionally and/or alternatively, the corrective action may include triggering a warning or system fault.

Self-contained software/firmware controlled hardware can be used to take corrective action if the warning severity or level warrants such action, such as slowing rotation speed, until the excessive displacement/vibration mode falls within acceptable levels. The corrective action can be initiated automatically or by human intervention.

The device 42 can be provided by a hardware-only circuit dedicated to shutdown procedure, for example. The detection module 36 and/or processor 28 can provide a software control loop that communicates with the engine controls to take corrective actions, such as reducing rotational speed. If the corrective actions fail, which could result in an overspeed condition, then the hardware-only circuit shuts the engine down. The hardware-only circuitry can use separate analog speed signals or the same analog speed signals that feed the analog-to-digital conversion process provided by, for example, the speed module 24.

This system also can be used for more sophisticated sensing schemes. For example multiple sensors 16 can be placed around the periphery of the given location, for example three sensors at 120 degrees, for example, at or near a bearing. Also, one or more sensors can be placed at different points along the axial length of a given rotating machinery to measure other locations, for example, at multiple bearing location or in between bearings. A maximum point of rotational deflection could then be measured which is attributable to vibrations and out of balance conditions that could lead to excessive wear, and in extreme conditions, a failure condition that may cause expensive repair or replacement.

One or more sensors combined with analog circuitry, an analog to digital conversion process, digital hardware, memory storage, and software that stores this varying rotational deflection amplitude over time can be used to correlates or match the deflection with known failure levels, failure modes, and vibration modes stored as data 32. The analog circuitry, for example, portions of the detection module 36, produces an envelope signal that reduces the required software and hardware resources that are required to measure peak amplitudes cycle to cycle. This reduces the size and power needed in terms of microprocessor/firmware/hardware processing. Based upon matches, fault and maintenance codes can be identified and outputted to provide messages to the aircraft operator and/or higher level monitoring system, such as the aircraft operational system or ground maintenance system. As a result of the faults or maintenance codes, maintenance or repair functions will be initiated, for example, wash front or rear rotor surfaces, replace rear bearing.

Although example embodiments have been disclosed, a worker of ordinary skill in this art would recognize that certain modifications would come within the scope of the claims. For example, the speed module 24, processor 28 and detection module 36 are illustrated as separate from one another, the components can be integrated or further separated in a variety of ways, if desired. Accordingly, the following claims should be studied to determine their true scope and content.

What is claimed is:

1. A turbo machine comprising:
    a rotating feature;
    a speed probe configured to detect a speed of the rotating feature and produce a speed signal indicative of the speed;
    engine controls configured to control operation of the turbo machine, the engine controls including a device;
    a speed module in communication with the speed probe and configured to receive the speed signal and produce a transformed speed signal in response to the speed signal, wherein the speed signal includes a rotational deflection amplitude, and the detection module compares the rotational deflection amplitude to at least one of a stored failure mode and vibration mode to determine a fault condition;
    a processor in communication with the speed module and configured to receive the transformed speed signal and produce a command signal in response to the transformed speed signal, the processor in communication with the engine controls and configured to provide command signal to the engine controls for operation of the turbo machine;
    a detection module in communication with the speed probe and configured to receive the speed signal, the detection module in communication with the device and configured to compare the speed signal with data to determine whether the speed signal is reliable, the detection module sending a first detection module signal to the device in response to an unreliable speed signal; and
    wherein the processor takes corrective action with the engine control in response to an unreliable speed signal, the device is hardware-only and includes a shutdown procedure that is employed if the corrective action fails.

2. The turbo machine according to claim 1, wherein the detection module is arranged in parallel to the speed module.

3. The turbo machine according to claim 2, wherein the detection module is arranged in parallel to the processor in relation to the engine controls and configured to bypass the processor.

4. The turbo machine according to claim 3, wherein the detection module is arranged in series to the processor and sending a second detection module signal to the processor, the processor taking corrective action with the engine controls.

5. The turbo machine according to claim 1, wherein the speed signal includes a voltage amplitude, and the data is an expected voltage envelope.

6. The turbo machine according to claim 5, wherein voltage amplitude below the expected voltage envelope corresponds to the unreliable speed signal.

7. The turbo machine according to claim 6, wherein the device is a fuel control component, and the first detection module signal reduces fuel flow to the turbo machine.

8. The turbo machine according to claim 1, wherein the speed signal is analog and the transformed speed signal is digital.

9. The turbomachine according to claim 1, wherein the data includes look-up tables indicative of a normal speed signal.

* * * * *